(12) United States Patent
Verachtert

(10) Patent No.: US 9,061,655 B2
(45) Date of Patent: Jun. 23, 2015

(54) METHODS FOR ENSURING THE SAFETY OF A WHEELCHAIR PASSENGER IN A TRANSPORT VEHICLE

(75) Inventor: Ton Verachtert, Shilde (BE)

(73) Assignee: VERBU B.V.B.A., Schilde (BE)

( * ) Notice: Subject to any disclaimer, the term of this patent is extended or adjusted under 35 U.S.C. 154(b) by 28 days.

(21) Appl. No.: 13/619,257

(22) Filed: Sep. 14, 2012

(65) Prior Publication Data

US 2013/0088348 A1    Apr. 11, 2013

(30) Foreign Application Priority Data

Sep. 15, 2011    (NL) ...................................... 1039041

(51) Int. Cl.

| | |
|---|---|
| *B60Q 1/00* | (2006.01) |
| *B60R 22/48* | (2006.01) |
| *A61G 3/08* | (2006.01) |
| *G06F 11/30* | (2006.01) |
| *G08B 21/02* | (2006.01) |
| *G09B 5/06* | (2006.01) |

(52) U.S. Cl.
CPC .............. *B60R 22/48* (2013.01); *A61G 3/0808* (2013.01); *G06F 11/30* (2013.01); *G08B 21/02* (2013.01); *G09B 5/06* (2013.01); *A61G 2203/32* (2013.01); *A61G 2220/12* (2013.01); *A61G 2220/16* (2013.01); *A61G 3/08* (2013.01); *A61G 2203/44* (2013.01)

(58) Field of Classification Search
USPC ........................................................ 340/457.1
See application file for complete search history.

(56) References Cited

U.S. PATENT DOCUMENTS

| | | | |
|---|---|---|---|
| 6,728,616 B1 * | 4/2004 | Tabe ................................ | 701/45 |
| 7,040,847 B1 * | 5/2006 | Cardona ........................... | 410/7 |
| 7,429,155 B2 * | 9/2008 | Sakano et al. ..................... | 410/7 |
| 2003/0122669 A1 * | 7/2003 | Filippov et al. ............... | 340/563 |
| 2006/0227862 A1 * | 10/2006 | Campbell et al. ............. | 375/240 |

* cited by examiner

*Primary Examiner* — Travis Hunnings
(74) *Attorney, Agent, or Firm* — Knobbe, Martens, Olson & Bear, LLP

(57) ABSTRACT

A method for ensuring the safety of a wheelchair passenger in a transport vehicle is disclosed. The method ensures that the wheelchair is blocked from moving by fixating the wheelchair to the vehicle floor and ensures that the wheelchair passenger is secured in his wheelchair by a safety-belt system. Prior to transport the method includes sensing if the wheelchair is correctly fixed to the vehicle floor and sensing if the safety-belt system is applied correctly. In a second aspect, a method for ensuring the safety of a wheelchair passenger in a transport vehicle is provided, by instructing the operator of the securing procedure to be followed. The safety of a wheelchair passenger in a vehicle is ensured by allowing the wheelchair user to indicate his status of safety.

11 Claims, 5 Drawing Sheets

METHODS FOR ENSURING THE SAFETY OF A WHEELCHAIR PASSENGER IN A TRANSPORT VEHICLE

TECHNICAL FIELD

The present invention relates to improved methods for ensuring the safety of wheelchair user's when being transported in vehicles such as for instance minivans. More specifically, the invention relates to an algorithm of steps, to be followed by the operator of the wheelchair user, often the driver of the vehicle, to assure that the wheelchair is properly immobilized. Furthermore, the invention relates to a monitoring system, which keeps the operator of the wheelchair passenger informed on the personal wellbeing of the wheelchair user as well as of its safety status.

BACKGROUND

Systems and methods to ensure the wellbeing and safety of mobility challenged users such as wheelchair users during vehicular transport are well known. These safety procedures may be related to various steps of the transport process, such as the boarding of the wheelchair user, restraining of the wheelchair to the vehicle floor or the restraining of the wheelchair user in the vehicle.

For instance, numerous safety systems have been proposed for devices such as wheelchair lifts, used to transport the user in and out the vehicle, whereby systems include mechanical, electrical, or electromechanical sensing, or a combination thereof. WO 2 005 037 593, describes a system and method for sensing the presence of an object on a device, such as a wheelchair lift. The system makes use of an electrical field to sense whether a device is occupied or not. The electrical field is excited by electrodes coupled to surfaces of the device. The one or more electrodes are linked to an electric field imaging module that communicates with an electronic controller. The electric field imaging module operates to drive the electrodes and receive inputs therefrom by sampling the electrodes' fields for discriminating changes or disturbances to the fields due to objects therein. The one or more electrodes may be selected sequentially by the module to detect an object in various locations and/or to determine an object's size, shape, and distance from the electrodes. When an object is sensed, the controller can disable a mobility access device or vehicle function so that user injuries are prevented.

U.S. 2 006 010 477 5 describes a vehicle access system which utilizes a belt buckle with an electronic safety interlock to prevent all movement of the access system until the safety belt is fastened to the buckle. The access system will prevent the access system from operating when the safety belt is not buckled. An alarm may equally be present to alert the operator of disengagement between the buckle and the belt.

U.S. Pat. No. 7,789,761 discloses a control system and method for controlling the operation of an auxiliary device, such as a wheelchair lift installed in a vehicle. The control system includes an electronic controller with a microprocessor or the like that operates under software control to communicate with a vehicle's original equipment manufacturer (OEM) controller and a plurality of sensors, which may be associated with OEM and auxiliary device subsystems. The auxiliary device controller processes the sensor communications to determine the occurrence of an unsafe condition, and prevents the operation of OEM and auxiliary device subsystems relative to the sensor communications to enhance the safety of an auxiliary device user.

Although considerable effort has been made to improve the safety of a wheelchair user when boarding a vehicle, less focus has been paid to the safety procedures inside the vehicle, and during driving. Several factors may however contribute to accidents during transport, often with severe consequences. Accidents might occur for instance due to inadequate restraining of the wheelchair to the vehicle floor or not buckling up the passenger during the trip. Often these mistakes and problems occur due to the lack of familiarity of the operator with the procedure or due to lack of operator training.

The ISO norm 7176/19 is related to 'Wheelchairs for use as seats in motor vehicles' and describes all characteristics that a wheelchair need to comply with, when used in a vehicular transport. ISO 7176/19 does not focus on procedures to be followed to assure the safety of the wheelchair user when being transported in a vehicle as well as certify that the wheelchair user is safely restraint to its place.

US Society of Automotive Engineers guideline SAE 32249 has specified design requirements, test methods and performances requirements for Wheelchair Tiedown and Occupant Restraint Systems (WTORS). These guidelines focus mainly on the requirements for the systems and auxiliaries, such as belts and strap-type tiedowns, and not on the safety procedures to be followed to securely restrain a person to its place in a vehicle.

Therefore, there is a need for improving the safety procedures to be followed by the operator when securing the wheelchair and its user prior to driving. Such a procedure should clarify the different steps and handling in a precise and clear manner. Moreover, it is desirable to link the procedure to a safety control system, which indicates potential problems or errors when they occur. Moreover, there is equally a need to improve the passenger's wellbeing and overall feeling of security when being in a vehicle. Since a wheelchair user is mobility challenged and can be seen as rather a passive user, he has to rely entirely on the operator's knowledge of the system to ensure his safety. This might cause a feeling of insecurity, whether grounded or not, and even discomfort for the passenger. Finally, as liability issues have become more and more a concern, wheelchair transport companies are looking for solutions to hedge themselves against lawsuits and are looking for ways to maximize their reliability.

It is the aim of the current invention to improve actual safety during transport of a physically challenged passenger, such as a wheelchair user, as well as to improve the overall safety feeling of the passenger. It is furthermore an object of the current invention to improve the reliability of this type of transport.

SUMMARY OF THE INVENTION

The current invention discloses a method for ensuring the safety of a wheelchair passenger in a transport vehicle. It is the aim of the invention to improve the overall wellbeing of the wheelchair user, as well as to guide the operator or vehicle driver with the safety procedures to be followed and to inform of any abnormality which may occur during the securing of the wheelchair to its correspondent place in the vehicle or during the transport.

More specifically, the current invention discloses a method according to claim 1. The method ensures that a wheelchair is correctly installed to its correspondent place in the vehicle and that both wheelchair and passenger are restraint in a safely manner.

In a more preferred embodiment, one or more sensors will be provided which will screen whether the fixation means for restraining the wheelchair, as well as the safety-belt system, restraining the wheelchair passenger, are correctly applied.

In a most preferred embodiment, an alarm unit will send out an alarm when said one or more sensors detect an abnormality during the restraining procedure. This alarm can be audible, visual or audio-visual.

In another preferred embodiment, said one or more sensors will instruct a signalization unit when said fixations means and safety-belt system are correctly applied. In a most preferred embodiment, said signalization unit is located on the dashboard of the vehicle.

In yet another embodiment, means will be provided which detect whether a wheelchair place is occupied. In a most preferred embodiment, said means comprise a sensor (for instance magnetic, capacitive or RF-ID), a manual button or manual switch.

In another aspect of the invention, a method is provided according to claim 11. By allowing the wheelchair passenger to indicate his status of his own safety, this will simultaneously strengthen his safety feeling.

In a final aspect, the invention discloses a method according to claim 12. In a preferred embodiment the operator or the wheelchair driver receives auditory, visual or audio-visual instructions.

DESCRIPTION OF FIGURES

FIGS. 1a and 1b depict an example of the steps that an operator preferably undertakes during preparation of the transport.

DETAILED DESCRIPTION OF THE INVENTION

The present invention concerns methods and devices for ensuring the safety of a wheelchair passenger in a transport vehicle.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

In a first aspect of the current invention, the invention discloses a method for ensuring the safety of a wheelchair passenger in a transport vehicle, by:
  ensuring that the wheelchair is blocked from moving by fixating said wheelchair to the vehicle floor by fixation means and;
  ensuring that the wheelchair passenger is secured in his wheelchair by a safety-belt system;
  whereby prior to transport said method comprises the steps of:
  sensing if said fixation means are applied correctly;
  sensing if said safety-belt system is applied correctly.

Figure 4:
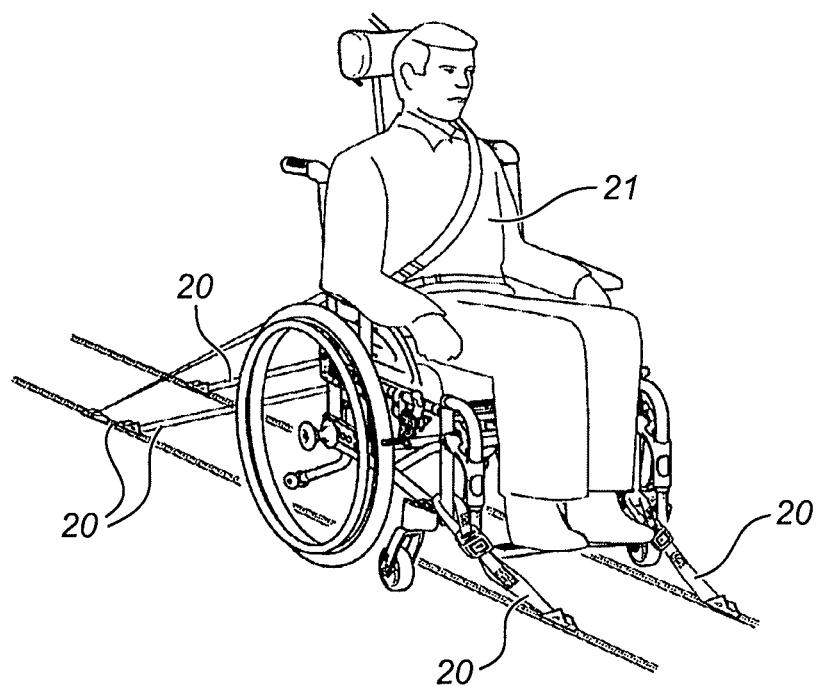
FIG. 4 exemplifies a wheelchair user secured in a vehicle by securing means and a safety-belt system.

Prior to transport, the wheelchair need to be restrained to the vehicle floor by fixation means. FIG. 4 exemplifies a wheelchair which is restrained to a vehicle floor by securing means (20). These fixation means comprise wheelchair tie-down components such as bars, straps, belts, anchors, clips, clamps or a docking system which hold the wheelchair in the desired position, with no or little room for movement. Examples of wheelchair restraints are disclosed in U.S. Pat. No. 6,113,325, U.S. Pat. No. 4,103,394, U.S. Pat. No. 5,344,265, U.S. Pat. No. 4,455,046, U.S. 2009/0214314 and U.S. Pat. No. 1,093,303. In a preferred embodiment, the said fixation means comprise a hook, strap and/or retractor capable of securing at least part of the wheelchair to said vehicle floor. In another preferred embodiment, said fixation means comprise a docking system. Said docking system preferably comprises a docking base on the vehicle floor and a pin attached to said wheelchair. Said pin attached to the wheelchair will be captured by a pair of locking levers and will be securely held in place by the docking base. In a more preferred embodiment, said fixation means may comprise electrical, mechanical, hydraulic, magnetic, electromagnetic and/or electromechanical locking means capable of locking and/or unlocking said retractor in and/or from a tighten-only state, preferably whereby said locking means comprises an electromechanically actuated pin and/or pawl connected to said retractor and connected to security-controlling means, preferably comprising a control button or switch for activating and/or deactivating said locking means.

In a preferred embodiment, the said fixation means are stored in a storage part of the floor or a floor plate of the vehicle. In a preferred embodiment, said storage parts may comprise a support frame comprising a lid-guiding edge and/or surface defining said trajectory of the lid between said closed and said open position.

In a preferred embodiment, said storage cavity may comprise a lid actuator and lid-opening means for opening and closing said lid.

In a more preferred embodiment, said combination of lid actuator and lid-opening means may comprise a screw drive.

In a more preferred embodiment, said lid actuator may comprise an electrical motor.

In a more preferred embodiment, said lid-opening means may comprise a spindle comprising a helical screw on its outside surface and a protrusion attached to the lid and capable of hooking into said helical screw of said spindle, whereby said lid actuator is capable of rotating said spindle, thereby pulling and/or pushing said lid via said protrusion, preferably along said trajectory.

In a preferred embodiment, said storage parts may comprise lifting means for lifting and lowering said wheelchair and/or wheelchair passenger fixation means above the floor level and below the floor level into said storage cavity.

In a more preferred embodiment, said lifting means may comprise a cantilever and cantilever pivoting means comprising a pivot axis, preferably lying essentially horizontal and transverse, around which said cantilever is capable of rotating, said cantilever at least partly located underneath said wheelchair and/or wheelchair passenger fixation means.

In an even more preferred embodiment, said support frame may be positioned on top of said cantilever pivoting means for constraining its translational movement, and said cantilever pivoting means may comprise lid-engaging means such as a notch or a protrusion, preferably at a transverse side edge of said cantilever pivoting means, which are capable of engaging with an edge, a protrusion and/or a notch of said lid when said lid is near the open position, hereby rotating said cantilever around said pivot axis upwards when said lid moves towards the open position and/or downwards when said lid moves towards the closed position.

In a preferred embodiment, said storage parts may comprise one or more lights such as LEDs, which can be lit and whose light is directed towards the expected position of the wheelchair when the lid is in said open position; preferably one or more of said lights are attached to said lifting means; preferably a switch for turning on and off said lights is connected to said lifting means, said switch being in the on position when said cantilever is in a lifting position and in the off position when said cantilever is in a storage position. Preferably switch is also connected to a sensor capable of detecting if fixation means are well applied and said switch in the off position when fixation means are well applied and said switch in the on position when fixation means are not correctly applied.

Next to the wheelchair which needs to be secured firmly to the vehicle floor, preventing the wheelchair from moving during transport, it is as well compulsory to restrain the wheelchair passenger to its wheelchair and place, again to prevent accidents during transport. Restraining of a passenger occurs generally by the use of a safety belt-system provided in the vehicle intended for wheelchair passenger transport. An example of such a safety-belt system (21) is depicted in FIG. 4.

Safety belt-systems for wheelchair passengers in vehicles are widely described in prior art. Examples include U.S. 2006 009756 2, U.S. 2010 009 226 3 and U.S. Pat. No. 6,113,325. In a preferred embodiment, the safety-belt system comprises a safety-belt and safety-belt attachment means, whereby said safety-belt attachment means comprise a first attachment point with belt-guiding means situated near the shoulder end of said rigid arm. The safety-belt system may be part of a device, which further comprises a foot support comprising foot attachment means for attachment to a vehicle floor and a rigid arm having a shoulder end and a foot end, said rigid arm connected near said foot end to said foot support characterized in that said rigid arm is attached to said foot support by means of one or more arm hinges, whereby said rigid arm is capable of rotating around said arm hinges. Because the rigid arm can rotate, the position of the first attachment point of the safety-belt system can be adjusted in height and horizontal displacement for the safety and comfort of wheelchair passengers. The rigid arm is attached to a foot support which can be fixed to a vehicle's floor with foot attachment means. In an embodiment, the foot attachment means for attaching the chair to the vehicle floor may be such that they are easily releasable and attachable to remove or add a chair from or to the vehicle if necessary. This increases the employability of the vehicle, since one can decide on the number of devices as presented in this document which are to be installed in a vehicle, e.g. when the expected number of wheelchair passengers is small, but the expected amount of luggage is large, the number of devices in the vehicle can be reduced, and when the expected number of wheelchair passengers is large, the number of devices in the vehicle can be increased.

The foot end of the rigid arm is the end which is located nearer to the feet of a seated person and/or to the arm hinges with which the rigid arm is connected to the foot support, while the shoulder end is located nearer to the shoulder of a seated person. The rigid arm is connected near its foot end to the foot support of the foldable chair. With 'near' its foot end, it is meant that the rigid arm is connected to the foot support in a region which is situated below or at most 40 cm, preferably at most 30 cm, more preferably at most 20 cm above the seating surface of the foldable chair in the unfolded position. Furthermore, a first attachment point of the safety-belt attachment means is situated near the shoulder end of said rigid arm. With 'near' the shoulder end, it is meant that the first attachment point is located along the rigid arm above the seating surface of the foldable chair in the unfolded position or the seating surface of an average wheelchair, preferably at least 20 cm, preferably at least 30 cm, more preferably at least 40 cm, even more preferably at least 50 cm above said seating surface. The first attachment point is preferably located just above the position of the shoulder of a seated person. Therefore, the rigid arm should at least be large enough such that, in an essentially upright position, its shoulder end is preferably located above the shoulder height of a tall seated person, hereby allowing the first attachment point to lie just above the position of the shoulder of a tall seated person. In a preferred embodiment, the first attachment point can be slideably adjusted along the rigid arm, hereby allowing a passenger to adjust the height of the first attachment point to improve his safety and comfort. In an embodiment, said device comprises a foldable chair comprising a seat element attached to said foot support with chair attachment means, and a back support attached to said seat element with back attachment means, said chair capable of being folded between an unfolded position suitable for transport of an able person and a folded position suitable for transport of a person in a wheelchair, whereby said chair in said unfolded position comprises a proximal side near said rigid arm in said essentially upright position and an opposite distal side. In the unfolded position, the chair offers a seating place to an able person, while in the unfolded position; the chair makes way for a wheelchair, without the necessity of removing it all together or partly from the vehicle. Therefore one or more of such chairs may be installed in vehicles which transport one or more able passengers, one or more disabled passengers, or a combination of both able and disabled passengers at the same time or at different times during consecutive trips.

When having boarded the vehicle, a wheelchair with passenger will be wheeled to its correspondent place in the vehicle. An operator, most likely also the driver of the vehicle, will be charged with the securing both the wheelchair to the floor as the wheelchair passenger to the wheelchair. Care has to be taken that both systems are safely and correctly applied, in order to prevent accidents during the transport. In these type of transports, the operator or driver is often not a professional but a volunteer, sometimes inexperienced with the safety procedures or technical aspects of the restraining systems. In order to prevent accidents, the method foresees a system which can warn the operator or driver for a potential risky situation or misuse of the restraining systems.

In a preferred embodiment, the method will, prior to transport, comprise the steps of:

sensing if said fixation means are applied correctly and;
sensing if said safety-belt system is applied correctly.

In a preferred embodiment, the said sensing occurs by one or more sensors.

In one embodiment, a sensor may be provided to the seatbelt buckle. In a more preferred embodiment, said sensor sends a signal to an alarm unit when said safety belt system is not applied correctly. In a more preferred embodiment, said sensor sends signal when safety-belt is disengaged from the buckle. Other examples of sensors that can be applied are given for instance in U.S. Pat. No. 7,4666,221, U.S. Ser. No. 12/228,989 0, U.S. Pat. No. 6,906,621, U.S. Pat. No. 6,264, 236 and U.S. Pat. No. 6,809,640. These examples are representative, but not meant to be limitative to the goal of current invention. In a more preferred embodiment, said sensor of the safety-belt is only active during transport or after the indications of the operator to the system that the securing procedure is terminated.

In another preferred embodiment, said sensing whether fixation means are correctly applied occurs through one or more sensors. In another preferred embodiment, said sensors will send a signal to an alarm unit if said fixation means are not applied correctly.

In one embodiment, in the case said fixation means comprise a hook, retractor and strap, sensors may be provided to the said either hook or straps. For instance, in one embodiment, a tension sensor can be provided to the straps of said fixation means, the sensor being generally designed to monitor the tension on the straps and, if the strap exhibits insufficient levels of tension that persist for more than a few seconds, the sensor will signalize to the alarm unit. Examples of tension-sensors suitable for the current invention can be found in U.S. 2008 024 631 6, U.S. 2005 008 320 7, U.S. Pat. No. 6,454,304 and U.S. Pat. No. 7,426,429, but should not be limited to these examples. In a preferred embodiment, each said strap is provided with a tension sensor. In another preferred embodiment, said tension sensor is only active during transport or after the indications of the operator to the system that the securing procedure is terminated. In one embodiment, the hook of said fixations means may equally be provided with a hook sensor that detects if said hook has engaged an anchorage point, said anchorage point preferentially being the frame of the wheelchair. The hook sensor is a device that detects a condition indicating the presence of the anchorage. In one embodiment, the sensor is a switch that is actuated physically when an object is encompassed by the hook. In another embodiment, the sensor is part of a ground detection circuit that detects when the hook is in contact with a grounded, metal object. In other embodiments, the sensor is a device that is responsive to eddy currents, ferrous metals, or another characteristic of anchorage points. In yet another embodiment, the sensor may be a proximity detector sensitive to objects within the throat of the hook.

In a preferred embodiment, each hook sensor is responsive to the specific anchorage point the hook is intended to engage.

In another preferred embodiment, said hook sensor is only active during transport or after the indications of the operator to the system that the securing procedure is terminated.

In another embodiment, when fixation means comprise a docking system, a sensor is be provided to said docking system to monitor the docking status during the duration of the trip, and will signal when said wheelchair is not fully engaged with said docking base.

In one embodiment, said sensor will send a signal to an alarm unit if said fixation means are not applied correctly. In another embodiment, said sensor will send a signal to an alarm unit if said safety-belt system is not applied correctly. In a preferred embodiment, said alarm unit will send out an auditory, visual and/or audio-visual alarm when receiving a signal from said sensor.

In one embodiment, said visual alarm may comprise a light which lights up when a sensor detects an abnormality during the securing procedure. The light will avert the operator that start of the transport should be prevented, as there is a potential safety risk. In more preferred embodiment, said light is present at the dashboard of the vehicle.

In another embodiment, said alarm might be auditory. A specific sound, for instance by a buzzer, can be heard when said sensor detects a fault during the securing procedure. Again, this is an indication for the operator that a potential dangerous situation might arise during transport, and that the safety of the wheelchair and its passenger needs to be re-checked. In another embodiment, said alarm might be an audio-visual alarm, whereby for instance both a lamp will light up and a specific sound can be heard.

In another embodiment, said signal send by alarm unit might vary with regards to the detected problem. If said sensor detects a problem raised from the fixation means, said alarm signal will differ from the alarm signal that would be activated when the problem rose from the safety-belt system. In one embodiment, said visual alarm might comprise two lamps, one corresponding to said fixation means and one to said safety-belt system. Whenever the sensor detects a problem corresponding to either the fixation means or the safety-belt system, the lamp of the corresponding system will signalize the problem to the operator. This way, the operator can easily deduct the origin of the alarm. In the case of said auditory signal, the nature of the auditory signal can differ depending on the nature of the problem during the securing process. Again, this allows for the operator to quickly locate the problem.

In a most preferred embodiment, the transport vehicle will be prevented from driving when said alarm unit receives a signal from said sensor. For this purpose an engine immobilizer will be fitted to said vehicle. When any sensor detects an abnormality after the securing procedure, the engine immobilizer will receive a signal and the vehicle will be prevented from driving. This feature will ensure optimal safety during transport of wheelchair passengers.

In a preferred embodiment, means are provided to indicate the start and end of the securing procedure of both the wheelchair and the wheelchair passenger. In another preferred embodiment, every wheelchair place in the vehicle is provided with said corresponding indication means. In a more preferred embodiment, said means comprise a button or switch corresponding to the seat or place in the vehicle. In another preferred embodiment, said means for indicating the start of the securing procedure comprises a wheelchair detection sensor (see below) and said means for indicating end of securing procedure comprise a button or switch. The operator will push or switch on said button or switch, when arriving at the wheelchair place in the vehicle, which is considered as the start of the securing procedure. Alternatively, a wheelchair detection sensor will detect the presence of said wheelchair on a correspondent place in the vehicle. In a most preferred embodiment, a signal will be send to said signalization unit in the vehicle upon indication of start and end of securing procedure by the operator. In a preferred embodiment, said signalization unit is located at the dashboard of the vehicle. In a more preferred embodiment, the said signalization unit comprises visual indicators, such as LED lamps. In a most preferred embodiment, said visual indicators will change color depending on the status of the securing procedure. Preferably, every wheelchair place in the vehicle has its correspondent visual indicator.

In a further preferred embodiment, said sensors ensuring that fixation means and safety-belt system are well-applied, will send a signal to said signalization unit when said fixation means and safety-belt system are correctly applied.

When the operator actuates said means for indicating start of securing procedure, or said sensor detects the presence of a wheelchair, the said visual indicators corresponding to the occupied wheelchair place in the vehicle on the dashboard, preferably LED lamps, will light up red. This is an indication for the driver or a potential second operator that the securing procedure is ongoing, or that either a problem has raised during the procedure, and that it is unsafe to start transport. In a preferred embodiment, when the operator indicates the end of the securing procedure, by actuating the said means for indicating end and start of the securing procedure, the said visual indicators corresponding to the occupied wheelchair place in the vehicle on the dashboard will light up green. This is a signal for the driver or operator that the securing procedure of the wheelchair and its passenger on that particular place is terminated. Preferably, the default status of said visual indicators will be green, which in practice means that these are either unoccupied wheelchair places or places with a fully secured wheelchair and wheelchair passenger. In a most preferred embodiment, the system provides for a double verification, whereby both the operator needs to indicate that a wheelchair is secure, and an autonomous system, said sensors, equally indicate the latter. Only then the signalization unit will indicate the all-clear to the driver of the vehicle.

In a preferred embodiment, said means to indicate the start and end of the securing procedure are equally provided with visual indicators, said visual indicators of said means indicate the status of the securing procedure, and may for instance comprise LED lamps. In a most preferred embodiment, when the operator actuates at the beginning of the securing procedure the means for indicating start and end of the securing procedure, the visual indicators corresponding to said means will light up red. In another most preferred embodiment, when the operator again actuates the means to indicate the end of said securing procedure, the visual indicators of said means will turn green. This indicates to the operator that the procedure is over. In a preferred embodiment, the default state of these visual indicators, prior to starting the securing procedure, is green.

In a preferred embodiment, activation of said sensors during transport or after indications of the operator may occur through a communication line between said sensor and said means for indicating start and end of the securing procedure. In a more preferred embodiment, said communication line may be electrical or optical or any other communications medium which could readily be adapted to function in the role of a communication line.

In one embodiment, the said means to indicate the start of the securing procedure might comprise a wheelchair detection sensor. This sensor will signal to the signalization unit that a place in the vehicle has been occupied with a wheelchair. Hence, the said visual indicators from the signalization unit which correspond to the particular place will indicate to the driver or operator that that place is taken. Preferably, in the case where said visual indicators comprise lamps, said lamps corresponding to the occupied place will light up red. More preferably, said lights will only return to its default state, said default state being green, when said operator indicates the end of the securing procedure and/or said sensors ensuring that fixation means and safety-belt system are correctly applied, give a signal that securement of the wheelchair is adequate. In a preferred embodiment, in the case where said vehicle can be used for both regular transport as well as wheelchair transport, said sensor will only be activated when the corresponding place in the vehicle can receive a wheelchair, and not if said place is to be used by regular able passengers. The latter may be arranged by linking the activation of the sensor to the absence of a regular seat on the corresponding place. Vehicles which are equipped to support the transport wheelchair users as well as able persons make mostly use of foldable seats or chairs, which will be folded and fastened to the side of the vehicle when their presence is not required. This way the place is available for occupation by a wheelchair user. In a preferred embodiment, said sensor will only be active when said seat is folded away. Hence, when a wheelchair is brought to the vacant place in the vehicle, in a preferred embodiment the sensor will send a signal to said signalization unit. In a more preferred embodiment, the visual indicators of the signalization unit corresponding to the vehicle place will indicate that said place is occupied. In the case where said visual indicators comprise a lamp, said lamp will turn red. In a most preferred embodiment, said lamp will only return to its default green status when the operator has indicated the end of the securing procedure and/or sensors indicate that wheelchair and passenger is safely secured. In a preferred embodiment, activation of said sensor when seat is in its stored, folded state may occur through a communication line between said sensor and said seat or means for attaching seat to the vehicle wall. In a more preferred embodiment, said communication line may be electrical or optical or any other communications medium which could readily be adapted to function in the role of a communication line.

In one embodiment, when indicating the start of the securing procedure by the indication means, for instance by pushing the correspondent button, activating the switch, or detecting the presence of a wheelchair by a sensor, the operator will simultaneously be presented with the devices required for executing said securing procedure. In another, more preferred embodiment, said devices required for executing the securing procedure will be automatically presented upon detection of the presence of a wheelchair on a place of the vehicle, preferably by a sensor. These devices comprise the fixation means for fixating the wheelchair to the vehicle floor. As mentioned above, in a preferred embodiment, said fixation means are stored in a storage part of the vehicle floor in the default state. Upon indicating the start of the securing procedure, the lids of said storage parts will open automatically and said fixation means will be presented to the operator. In the case where said fixation means comprise a retractor, the retractor will be unlocked automatically upon indication of start of the securing procedure. After finalizing said securing procedure and indicating the end of it through the provided means, the retractor and straps will lock automatically, in order to prevent movement of the wheelchair during transport.

In a second aspect of the current invention, the operator will be instructed of the securing procedures to be followed. In a preferred embodiment, said instructions can be auditory, visual and/or audio-visual. As mentioned above, when the operator indicates he wishes to start the securing procedure, preferably by actuating the means for indicating start and end of the securing procedure, the means for securing the wheelchair will be unlocked and presented to the operator. In a preferred embodiment, said securing means will be equipped with visual instructions, said visual instructions are preferably lamps illuminating said securing means. In a preferred embodiment, said lamps are built in the storage part of the floor, storing the securing means. In a more preferred embodiment, said securing means are one by one illuminated, indicating the operator the order of securing which should be followed. In a more preferred embodiment, said visual instructions are accompanied by auditory instructions, which explain the operator the whole securing procedure and the steps that need to be undertaken to secure both the wheelchair and the wheelchair passenger. By instructing the operator throughout the whole securing procedure, the risk that problems or faults occur during said securing procedure which can affect the safety during the transport are minimalized. Moreover, the instructions will create an assuring feeling for both the operator and the wheelchair passenger, as the instructions serve as a support to confirm that the securing procedure progresses well. Especially for the wheelchair passenger, which can be considered as a passive spectator during the securing procedure, it can be reassuring to be able to follow whether all aspects of the procedure has been taken into account. After having indicated that the securing procedure is terminated, the instructions will also come to an end.

Figure 2:
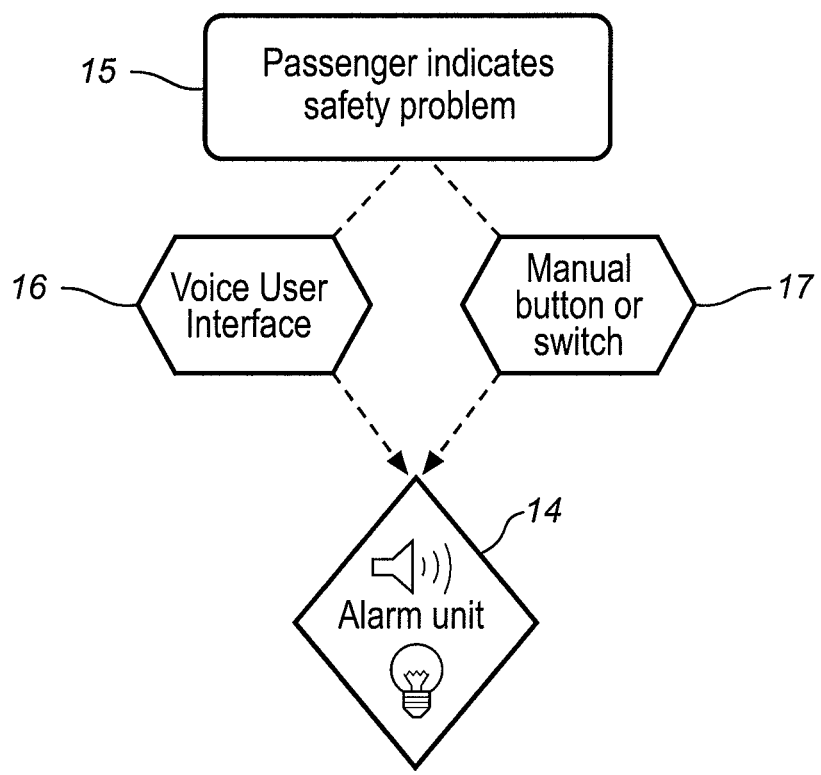
FIG. 2 is a flow diagram of one embodiment of the current invention, exemplifying a method whereby the passenger can indicate his status of safety.

In an aspect of the current invention, means are provided to allow said wheelchair user to indicate his status of safety (see FIG. 2). In one embodiment, said means may comprise an alarm button which can be activated in case of problems or emergencies. In a preferred embodiment, upon activating said button, a signal will be send to the alarm unit, and an auditory, visual or audio-visual signal will be given to alert the operator and/or driver. In another embodiment, said means may comprise speech recognition technology, such as a voice user interface (VUI). The VUI can be programmed to interpret a range of key words which are related to safety, or indicate that a problem has occurred and help is needed. Preferentially, when said VUI receives an order that is to be interpreted as an alarming or problematic situation, a signal will be transmitted to the alarm unit. Use of speech recognition technology might be of specific interest in the situation where the wheelchair passenger is less mobile and has little or no ability to activate a button. During transport, the driver often has a scarce knowledge of what happens in the passenger compartment of the vehicle. Therefore, a system that allows the wheelchair passenger to signal problems is indispensable for ensuring the safety during transport.

When the signalization and alarm unit indicate that it is safe to depart, in a preferred embodiment, the driver will be able to switch of said means for indicating start and end of the securing procedure. This way, passengers or other present persons in the vehicle will not be able to accidentally turn on the said means. Preferably, said means can be turned off by a button or switch, more preferably said button or switch is present at the dashboard of the vehicle.

When the vehicle arrives at its destination, the fixation means, as well as all sensors coupled to the securing procedure need to be unlocked or temporarily inactivated. In a preferred embodiment, each place in the vehicle will be provided by means to said unlock and inactivate the required fixation means and sensors. Said means to unlock and inactivate may comprise a button or switch. Preferably, every seat has a corresponding button or switch.

Figure 3:
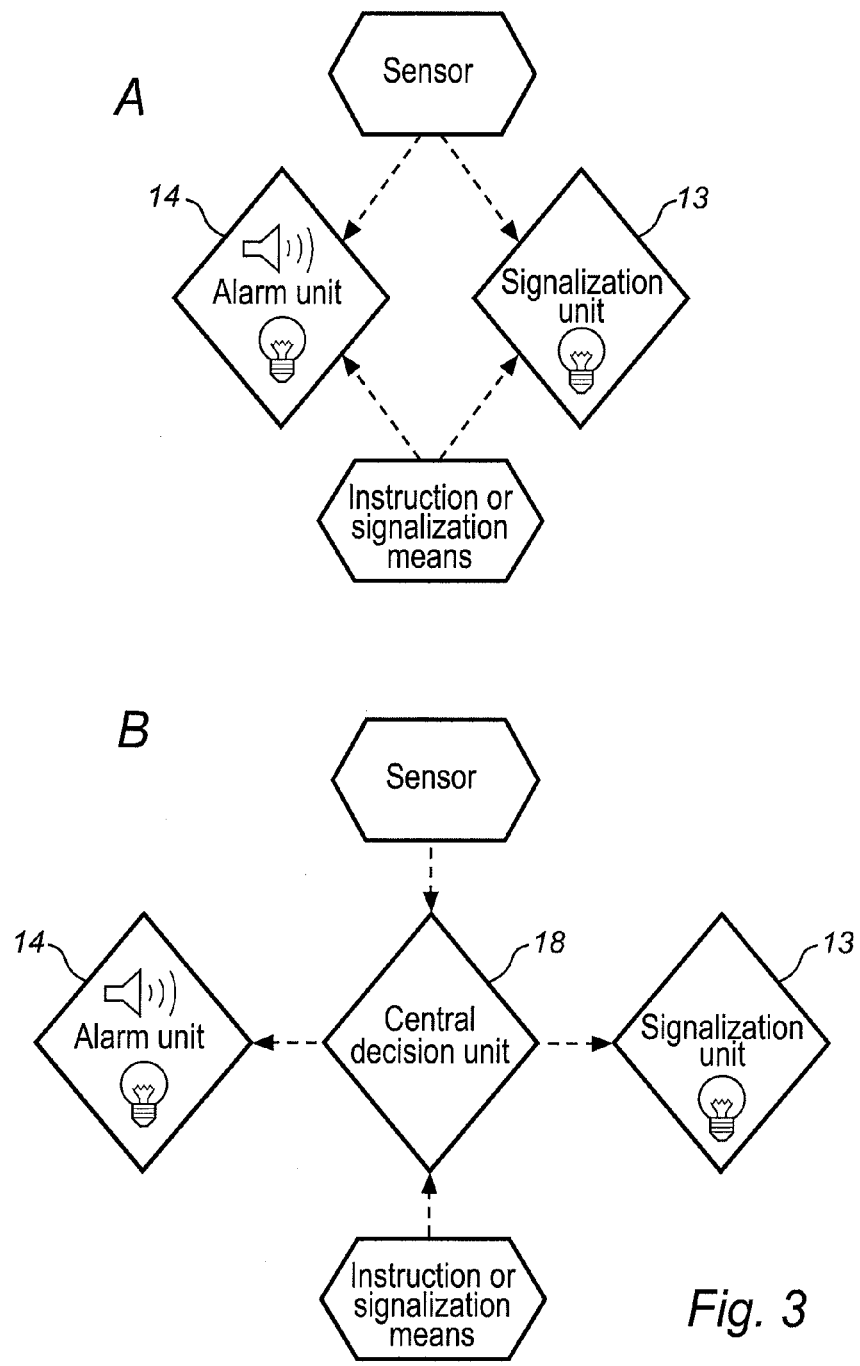
FIGS. 3A and B exemplify the possibilities of transmitting a signal send from a sensor or button to a receptor unit in the current invention.

With respect to FIG. 3, in one embodiment of the current invention, all sensors and means able of sending or instructing a signal employed in the current method of the invention will directly signal to their receivers, more particularly to said signalization unit (13) and/or alarm unit (14) (see FIG. 3a). In another embodiment, said utilized sensors or means will signalize to a central decision unit (18), which on its turn will instruct said signalization unit (13) and alarm unit (14) to react accordingly (see FIG. 3B).

In an embodiment of the current invention, all information gathered by said sensors and said signalization, alarm and/or central decision unit units during the securing procedure as well as during the duration of the transport can be communicated to a central station of the transport company, preferably through a data transfer service such as a GPRS. Data transfer services are readily used to inform the transport company of the time schedule of the transport vehicles on the road, in order to optimize the planning. By sending through all the collected data, the transport company will get a thorough overview of the degree of occupancy of the vehicle and the security status of all passengers. Again, this will further enhance the reliability of the transport company and the service it is offering.

In an embodiment, after transport, the method comprises the steps of:
  sensing if a wheelchair passenger remains behind in said vehicle,
  whereby preferably said sensing if fixation means and safety-belt system is applied correctly occurs by one or more sensors.

These steps can be taken in addition to the previously mentioned steps, or they can be taken separately. Therefore, in a further aspect, the present invention pertains a method for ensuring the safety of a wheelchair passenger in a transport vehicle, whereby after transport, said method comprises the steps of:
  sensing if a wheelchair passenger remains behind in said vehicle,
  whereby said sensing if fixation means and safety-belt system is applied correctly occurs by one or more sensors.

It routinely happens that a passenger, and a wheelchair passenger is accidentally left behind in a vehicle, closed off from other people and not able to get out of the car or call for help. The present invention tries to overcome this severe problem by sensing the presence of a passenger which is left behind.

In an embodiment, said method comprises comprising the steps of: registering and/or recording data about said transport, said data preferably comprising any or any combination of:
  number of passengers in the vehicle during transport;
  number of wheelchairs in the vehicle during transport;
  duration of transport;
  time of occupancy of one or more seats during transport;
  occupancy degree of seats and wheelchair-accommodating places in said vehicle during transport.

Such data may be used for further optimization of transport parameters, such as number of seats for able people and number of wheelchair-accommodating places, or transport routes.

In an embodiment of the methods of the present invention, said sensors comprise a $CO_2$-detection sensor and/or a weight sensor for detecting the presence and/or position of a passenger.

In an embodiment, a time delay occurs between said sensing if a wheelchair passenger remains behind in said vehicle and a moment which signals the end of the transport, whereby preferably the end of transport is signaled by any or any combination of: removal of an ignition key or card from an ignition of said vehicle, a sensed pre-determined distance between an ignition key or card and said vehicle, a locking of one or more doors, whereby preferably the time delay is less than 120 minutes, more preferably less than 90 minutes, even more preferably less than 60 minutes, yet more preferably less than 50 minutes, yet even more preferably less than 40 minutes, still more preferably less than 30 minutes, and preferably more than 30 seconds, more preferably more than 1 minute, more preferably more than 2 minutes, even more preferably more than 3 minutes, yet more preferably more than 4 minutes, still more preferably more than 5 minutes, most preferably about 20 minutes. It may be expected that an average stop for e.g. delivering or picking up passengers, will take less than 20 minutes.

In an embodiment, at least one of the sensors is sending a signal to an alarm unit, whereby said alarm unit sends out an alarm to an exterior alarm central, e.g. a central station of the transport company, preferably through a data transfer service such as a GPRS. In a preferred embodiment, said alarm central contacts a driver of said vehicle or an accompanying person of a wheelchair passenger of said vehicle upon receival of said alarm.

EXAMPLES

Figure 1A:
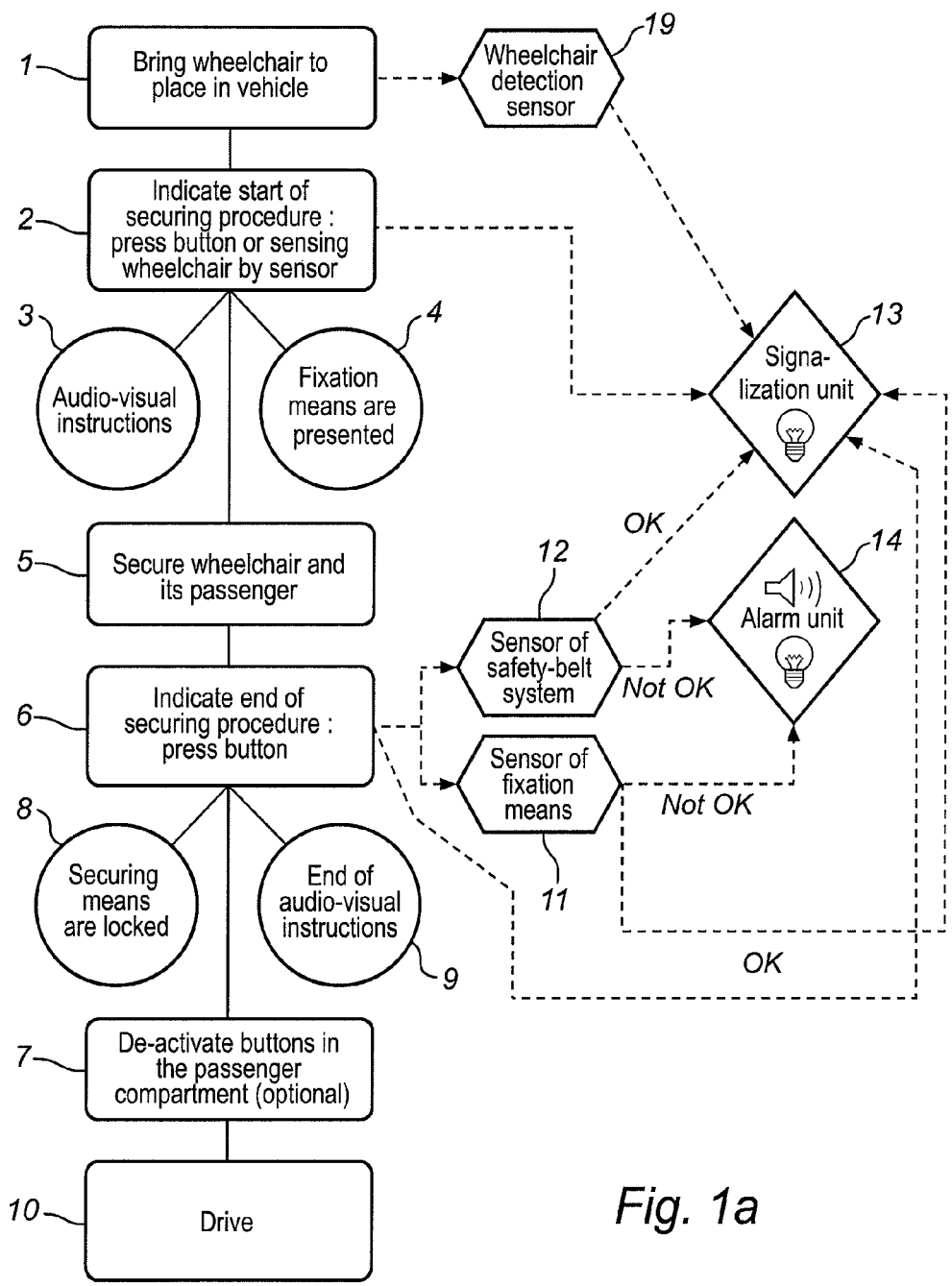
FIGS. 1a and b show flow diagrams of an embodiment of the method according to the current invention. More specifically, both

With respect to FIGS. 1a and b, preferred embodiments of the current invention are depicted in a flow chart.

In a first step, the operator brings the wheelchair and its passenger to its place in the vehicle (1). A sensor (19), preferably only active when said place is free to receive a wheelchair, will detect the presence of the wheelchair and send a signal to the signalization unit (13). Preferably, the signalization unit (13) will comprise visual indicators, such as LED lamps, on the dashboard of the vehicle, which correspond to a specific place in the vehicle and whereby said visual indicators will indicate to the operator or driver that a wheelchair is present on a specific place. Preferentially, when the visual indicators are LED lamps, said LED lamps will light up red.

Figure 1B:
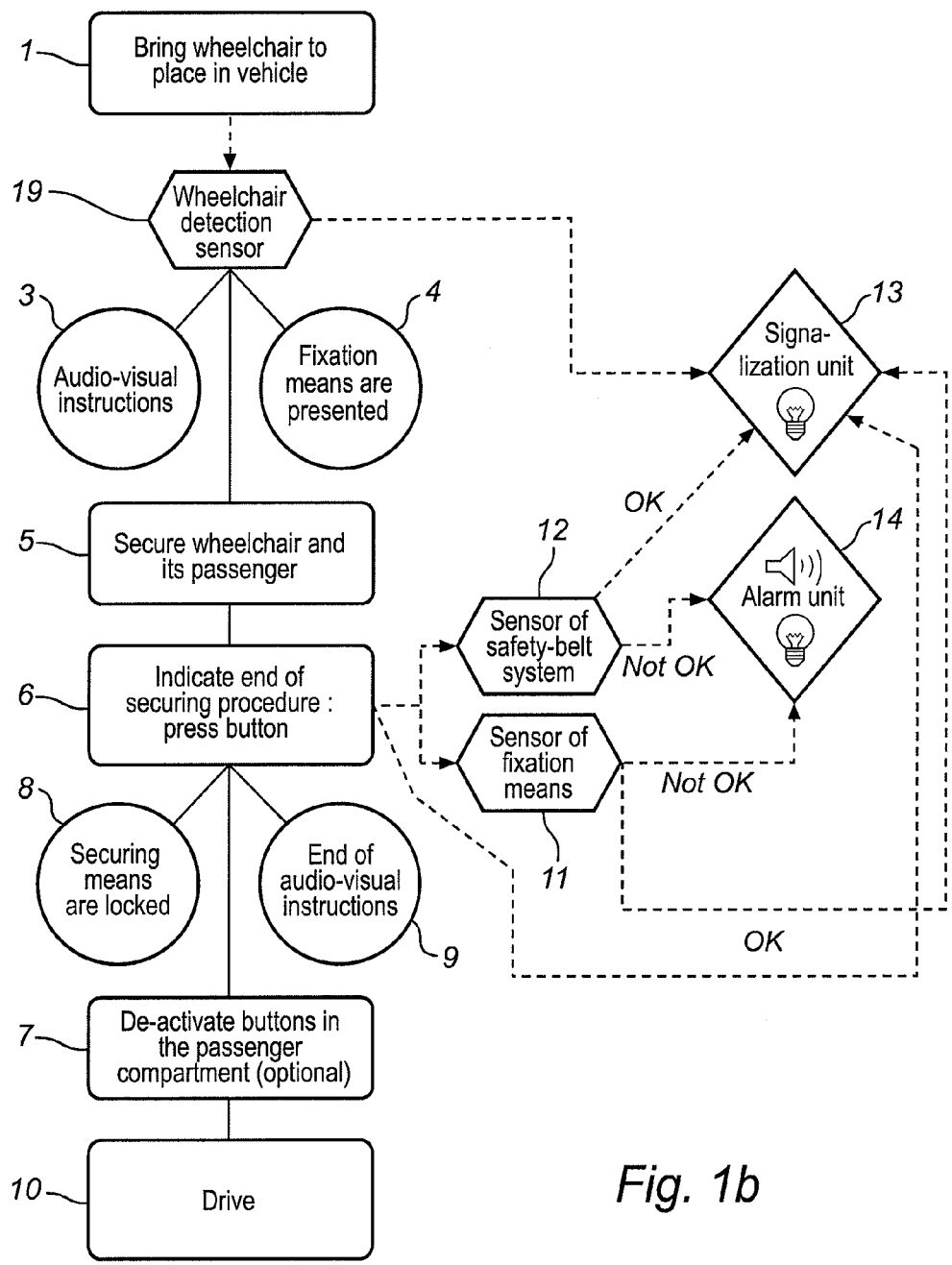

Next, the operator can indicate the start of the securing procedure by pressing a button or switching on a switch (2). The button or switch comprises a light which will turn from green to red when the start of the securing procedure is indicated. By activating said button or switch, a signal will be send to the signalization unit (13) to indicate that the securing procedure is ongoing, and hence it is unsafe to start the transport. The visual indicators corresponding to the wheelchair place will light up red, or remain red, in the case where said a wheelchair detection sensor (19) was present. By indicating the start of the securing procedure, the system will equally be instructed to start audio-visual instructions (3) correspondent to the securing procedure and simultaneously, the fixation means for the wheelchair, in default state hidden in floor compartments, will be presented to the operator (4) (FIG. 1a). In another example, both the presentation of the fixation means and the start of the audio-visual instructions will be activated as soon as the wheelchair detection sensor (19) has detected the presence of a wheelchair on a specific place, and the operator will not be required to manually indicate the start of the securing procedure (FIG. 1b). During the securing procedure, the operator will secure the wheelchair to the vehicle floor, put the brake on the wheelchair, and secure equally the wheelchair passenger by a safety-belt system (5). When the securing procedure is terminated according the operator, the operator will indicate the end of the securing procedure by again pushing the button or switch (6). The light corresponding with the button will return to its default green status and a signal will be send to the signalization unit (14). Simultaneously, by indicating the end of the securing procedure, sensors corresponding with the fixation means (11) and the safety belt system (12) will become activated. The latter will sense whether said fixation means and safety belt system are applied correctly, and whether there is no safety risk. In the case that said one of the sensors detects an abnormality, the said sensor will signal to an alarm unit, which will on its turn send out an auditory, visual and/or audio-visual alarm. In the case where the sensors do not detect any problem, a signal will be send to the signalization unit (14). Only in the case where both the operator indicates the end of the securing procedure and where the sensors signal that everything is safe, the visual indicators of the signalization unit will indicate that it is safe to start the transport (10). In this example, the visual indicators comprise lamps, which will turn from red to green. By indicating the end of the securing procedure, the system will lock the securing means (8) and end the audio-visual instructions (9). Optionally, when the visual indicators of the signalization unit give the driver the all-clear to depart, the driver can de-activate the buttons in the passenger compartment by pressing a button present at the dashboard. This is to prevent the passengers of accidentally reactivating the securing procedure.

The present invention has been described in considerable detail in order to comply with the patent laws by providing full public disclosure of at least one of its forms.

However, such detailed description is not intended in any way to limit the broad features or principles of the present invention, or the scope of patent monopoly to be granted.

Therefore, the present invention provides, but is not limited to:

1. A method for ensuring the safety of a wheelchair passenger in a transport vehicle, by:
    ensuring that the wheelchair is blocked from moving by fixating said wheelchair to the vehicle floor by fixation means and;
    ensuring that the wheelchair passenger is secured in his wheelchair by a safety-belt system;
   whereby prior to transport said method comprises the steps of:
    sensing if said fixation means are applied correctly;
    sensing if said safety-belt system is applied correctly.
2. A method according to point 1, whereby said sensing if fixation means and safety-belt system is applied correctly occurs by one or more sensors.
3. A method according to point 2, whereby a sensor is sending a signal to an alarm unit if said fixation means are not applied correctly.
4. A method according to point 2, whereby a sensor is sending a signal to an alarm unit if said safety-belt system is not applied correctly.
5. A method according to points 3-4, whereby said alarm unit sends out an auditory, visual and/or audio-visual alarm when receiving a signal form said sensor.
6. A method according to point 5, whereby said transport vehicle will be prevented from driving when said alarm unit receives a signal from said sensor.
7. A method according to point 2, whereby one or more sensors is sending a signal to a signalization unit if said fixations means and safety-belt system are correctly applied.
8. A method according to point 7, whereby said signalization unit is located on the dashboard of said vehicle.
9. A method according to point 1, whereby means are provided to indicate that a wheelchair place is occupied.
10. A method according to point 9, whereby said means can comprise a sensor, a manual button or manual switch.
11. A method according to point 10, whereby said securing means are presented to the operator upon occupancy of said wheelchair place.

12. A method to ensure the safety of a wheelchair passenger in a transport vehicle, by instructing the operator of the securing procedure to be followed.
13. A method according to point 12, whereby said instructions can be auditory, visual and/or audio-visual.
14. A method to ensure the safety of a wheelchair passenger in a transport vehicle, by providing means to allow said wheelchair user to indicate his status of safety.

What is claimed is:

1. A method for ensuring the safety of a wheelchair passenger in a transport vehicle, by:
    ensuring that the wheelchair is blocked from moving by fixating said wheelchair to the vehicle floor by fixation means and;
    ensuring that the wheelchair passenger is secured in his wheelchair by a safety-belt system;
    wherein prior to transport said method comprises the steps of:
    sensing if said fixation means are applied correctly;
    sensing if said safety-belt system is applied correctly,
    wherein said sensing if fixation means and safety-belt system is applied correctly occurs by one or more sensors, wherein after transport, said method comprises the steps of sensing if a wheelchair passenger remains behind in said vehicle, wherein a time delay occurs between said sensing if a wheelchair passenger remains behind in said vehicle and a moment which signals the end of the transport, wherein the end of transport is signaled b an or an combination of: removal of an ignition key or card from an ignition of said vehicle, a sensed pre-determined distance between an ignition key or card and said vehicle, a locking of one or more doors, wherein the time delay is less than 30 minutes and larger than 5 minutes.

2. The method according to claim 1, comprising the steps of: registering and/or recording data about said transport, said data comprising any or any combination of:
    number of passengers in the vehicle during transport;
    number of wheelchairs in the vehicle during transport;
    duration of transport;
    time of occupancy of one or more seats during transport;
    occupancy degree of seats and wheelchair-accommodating places in said vehicle during transport.

3. The method according to claim 1, wherein a sensor is sending a signal to an alarm unit if said fixation means are not applied correctly and/or wherein a sensor is sending a signal to an alarm unit if said safety-belt system is not applied correctly, wherein said alarm unit sends out an auditory, visual and/or audio-visual alarm when receiving a signal from said sensor.

4. The method according to claim 1, wherein said transport vehicle will be prevented from driving when said alarm unit receives a signal from at least one of said sensors.

5. The method according to claim 1, wherein one or more sensors is sending a signal to a signalization unit if said fixations means and safety-belt system are correctly applied, wherein said signalization unit is located on the dashboard of said vehicle.

6. A method according to claim 1, wherein means are provided to indicate that a wheelchair place is occupied, wherein said means can comprise a sensor, a manual button or manual switch.

7. The method according to claim 6, wherein securing means are presented to the operator upon occupancy of said wheelchair place.

8. The method according to claim 1, wherein said sensors comprise a CO2-detection sensor and/or a weight sensor.

9. A method for ensuring the safety of a wheelchair passenger in a transport vehicle, wherein after transport, said method comprises the steps of:
    sensing if a wheelchair passenger remains behind in said vehicle,
        wherein said sensing if fixation means and safety-belt system is applied correctly occurs by one or more sensors,
        wherein a time delay occurs between said sensing if a wheelchair passenger remains behind in said vehicle and a moment which signals the end of the transport, wherein the end of transport is signaled b an or an combination of: removal of an ignition key or card from an ignition of said vehicle, a sensed pre-determined distance between an ignition key or card and said vehicle, a locking of one or more doors, wherein the time delay is less than 30 minutes and larger than 5 minutes.

10. A method for ensuring safety of a wheelchair passenger in a transport vehicle, by:
    ensuring that the wheelchair is blocked from moving by fixating said wheelchair to the vehicle floor by fixation means; and
    ensuring that the wheelchair passenger is secured in his wheelchair b a safety-belt system,
    wherein prior to transport said method comprises the steps of:
    sensing if said fixation means are applied correctly;
    sensing if said safety-belt system is applied correctly;
        wherein said sensing if fixation means and safety-belt system is applied correctly occurs b one or more sensors, wherein a sensor is sending a signal to an alarm unit, wherein said alarm unit sends out an alarm to an exterior alarm central, wherein said alarm central contacts a driver of said vehicle or an accompanying person of a wheelchair passenger of said vehicle upon receiving said alarm.

11. A method for ensuring the safety of a wheelchair passenger in a transport vehicle, wherein after transport, said method comprises the steps of:
    sensing if a wheelchair passenger remains behind in said vehicle,
    wherein said sensing if fixation means and safety-belt system is applied correctly occurs by one or more sensors, wherein a sensor is sending a signal to an alarm unit, wherein said alarm unit sends out an alarm to an exterior alarm central, wherein said alarm central contacts a driver of said vehicle or an accompanying person of a wheelchair passenger of said vehicle upon receiving said alarm.

* * * * *